G. H. CORLISS.
AIR-PUMP CONNECTIONS FOR STEAM-ENGINES.

No. 190,958. Patented May 22, 1877.

Witnesses:
C. C. Stetson
M. A. Caypless

Inventor:
Geo. H. Corliss
by his attorney
T. D. Stetson

UNITED STATES PATENT OFFICE.

GEORGE H. CORLISS, OF PROVIDENCE, RHODE ISLAND.

IMPROVEMENT IN AIR-PUMP CONNECTIONS FOR STEAM-ENGINES.

Specification forming part of Letters Patent No. 190,958, dated May 22, 1877; application filed May 3, 1877.

*To all whom it may concern:*

Be it known that I, GEORGE H. CORLISS, of Providence, in the State of Rhode Island, have invented certain Improvements Relating to Air-Pump Connection for Steam-Engines, of which the following is a specification:

The invention is intended to apply more particularly in machinery employed in driving a series of pumps, arranged in the manner shown in the patent to me dated June 2, 1857, No. 17,423. Some of the advantages of the invention may, however, be realized in any case where an upright shaft is driven by the direct connection of one or more steam-engines to a crank thereon.

That patent of 1857 calls for as many steam-cylinders as there are pumps. The steam-engines are alternated with the pumps, and arranged in the same plane. I have now devised an improvement whereby the series of pumps is driven by the aid of gearing from a quicker shaft, which, like the main shaft, is upright, and has a crank upon its upper end. To the pin of that crank an engine is coupled. The connecting-rod for this quick-acting engine plays horizontally across over the top of the stout shaft which operates the series of pumps. I have attached simple means for working the air-pump.

The fact has long been recognized that the air-pump bucket should work slower than the steam-piston; also, that the air-pump should be supported upon the framing, near the cylinder, to avoid the necessity for extending the framing, and causing it to be needlessly strained; also, that the air-pump should be considerably below the level of the cylinder, in order to take the water freely from the condenser; and also that, for the best work, the air-pump should be upright.

My invention allows the attainment of all these ends. I pivot a horizontal lever to the framing of the engine, and connect its other end to the crank-pin by a light connecting-rod, so that it swings in a horizontal plane a little higher than the piston-rod. A connection extends from near the middle of this lever to the upright arm of a bell-crank lever, which may be as near as desired to the steam-cylinder, and may, by its other arm, work an upright air-pump stationed at any desired level below.

The accompanying drawings form a part of this specification.

Figure 1:
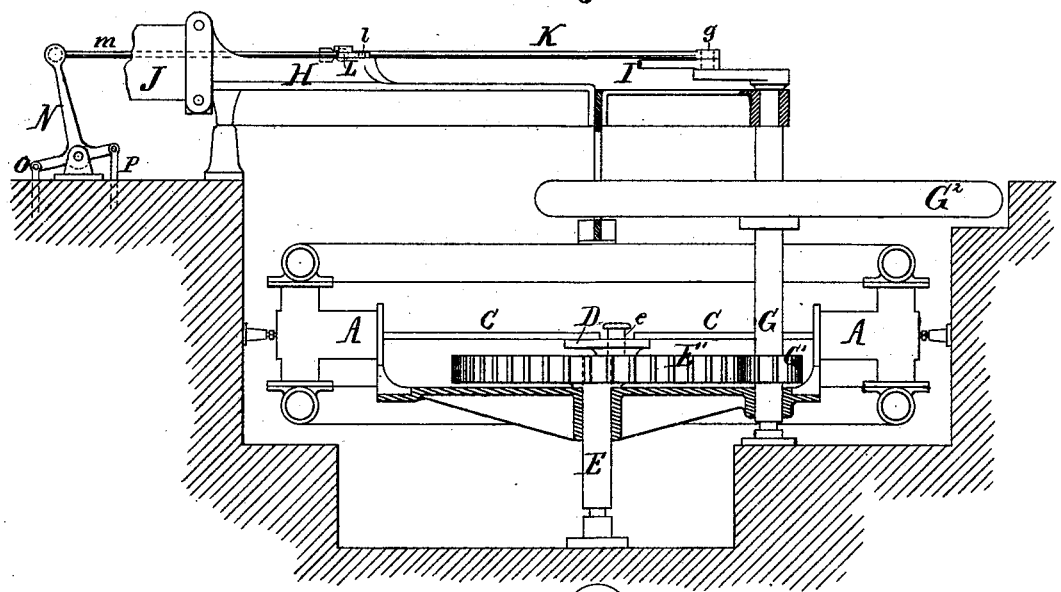
Figure 2:
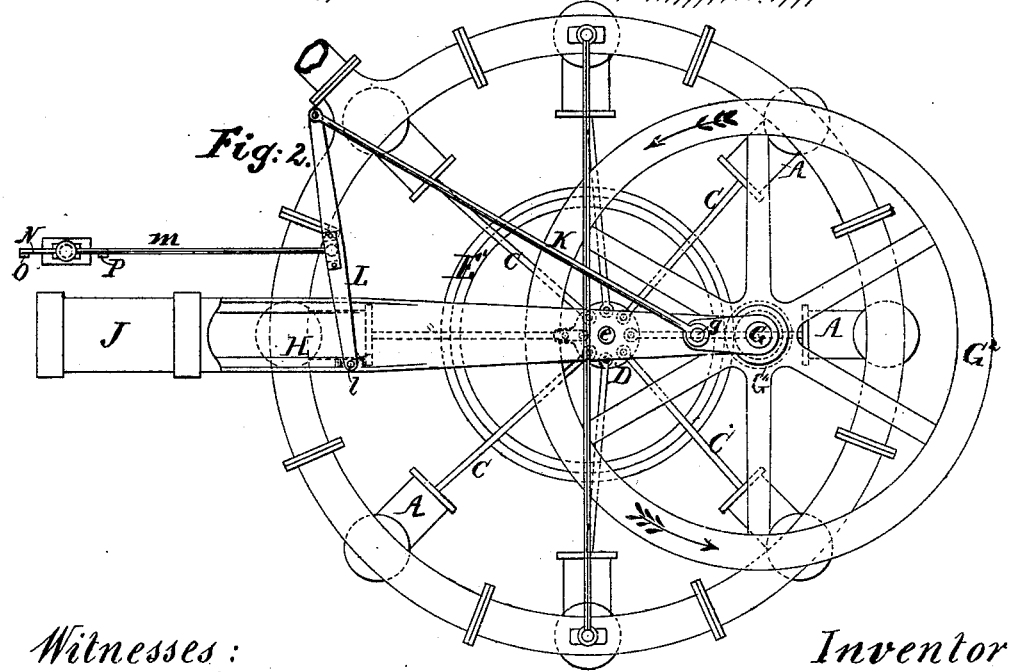

Figure 1 is a side elevation, partly in section, and Fig. 2 is a plan view.

Similar letters of reference indicate like parts in both the figures.

A A, &c., are the barrels of the series of pumps, provided with the proper water-connections. C C are connections from the pump-pistons (not represented) to a piece, D, driven by the crank-pin $e$ on the slow shaft E, which receives motion by gears E' G¹ from the quicker upright shaft G, which carries a heavy fly-wheel, G², and is driven by the steam in the steam-cylinder J. I is the connecting-rod, which extends across over the whole, and communicates motion from a quick-acting piston (not represented) in the cylinder J to the crank-pin $g$.

The arrangement allows the entire apparatus to be contained in a comparatively small pumping-house, and all the parts are sufficiently separated to allow ready access for repairs or renewals.

The connecting-rod I extends in a direct line from the steam-cylinder J to the shaft G.

The framing H carries a center, $l$, on which the long lever L may swing horizontally to any desired extent. The other end of the lever L is connected by the rod K to the crank-pin $g$. From a point near the midlength of the lever L a rod, $m$, extends, having a universal joint at each end. This communicates the reduced motion to the upper and long arm of the lever N, which may be, and preferably is, of an inverted T shape.

One of the lower arms may move the air-pump rod O. The other may move the feed-pump rod P. This lever N may be a simple bell-crank, if preferred. Both the levers L and N are pivoted on the engine-framing, or on the adjacent fixed work of the building.

There is ample room for the mechanism, and any adjustments required, without interfering with the pumps below.

The different direction in which the connection K extends from that in which the connecting-rod I extends has an effect on the time of working the air-pump relatively to the time of the engine passing its dead-center.

My invention allows of the shaft G being turned either way; but there is an advantage in turning it in the direction indicated by the arrow. The greatest resistance to the motion of the air-pump bucket is in the last part of its upstroke. The arrangement causes this to come not in the last part of the outstroke of the piston, but considerably earlier, while the effect of the steam is still strong.

I claim as my invention—

In combination with the steam-cylinder J and connecting-rod I, the horizontally-vibrating lever L, its link K, and crank for communicating motion through the connection m to the air-pump lever N, substantially as specified.

In testimony whereof I have hereunto set my hand this 16th day of June, 1876, in the presence of two subscribing witnesses.

GEO. H. CORLISS.

Witnesses:
GEORGE A. DODGE,
ED. W. RAYNSFORD.